Patented Apr. 25, 1950

2,505,253

UNITED STATES PATENT OFFICE 2,505,253

THENOYLAMINOANTHRAQUINONES

Henry R. Lee, Pitman, and Clarence F. Belcher, Bridgeton, N. J., assignors to E. I. du Pont de Nemours & Company, Wilmington, Del., a corporation of Delaware No Drawing. Application December 5, 1947, Serial No. 790,012

5 Claims. (Cl. 260—329)

This invention relates to the preparation of dyes and dye intermediates of the anthraquinone series, and more particularly to the production of new thenoylaminoanthraquinone compounds.

It is known that, by the introduction of benzoylamino groups in the anthraquinone molecule, valuable dyes of varying shades, as well as numerous dye intermediates which are useful in the preparation of dyes, may be produced. These intermediates are valuable in the preparation of vat dyes, acid wool dyes and dyes for synthetic fibers.

It is an object of the present invention to provide a new and valuable series of thenoylaminoanthraquinone compounds which are useful as dyes for various fibers and as intermediates for the preparation of other dyes.

We have found that a new and valuable class of dyes and dye intermediates may be produced by condensing aminoanthraquinone compounds with 2-thenoic acid or its derivatives, whereby compounds of the general formula:

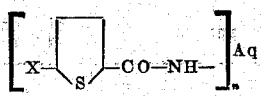

are produced, in which $n$ stands for one of the numbers 1 or 2, X stands for hydrogen, a halogen-, methyl- or nitro-group and wherein Aq stands for an anthraquinone nucleus which may contain one or more simple monovalent constituents of the group consisting of —Cl, —Br, —CH$_3$, —NO$_2$, —NH$_2$, —OH and —OCH$_3$. The introduction of the thenoylamino group into the anthraquinone molecule produces compounds which have unusual and unexpected color properties as compared to the corresponding benzoylaminoanthraquinone compounds. Even in the simplest anthraquinone derivatives the introduction of thenoylamino group produces compounds which are deeper in shade and which are stronger on an equal weight basis than the corresponding benzoylamino derivatives.

These thenoylaminoanthraquinone compounds are produced by reacting aminoanthraquinones, which may also carry other simple monovalent substituents, with 2-thenoic acid or its derivatives by the usual acylating methods.

The following examples are given to illustrate the invention, it being understood that these examples are merely illustrative and are not to be construed as limitations upon the invention. The parts used, unless otherwise specified, are by weight.

Example 1

A mixture of 12 parts of 1-aminoanthraquinone and 84 parts of nitrobenzene is heated to 125° C. under agitation, and then a solution of 11.8 parts of 2-thenoyl chloride in 12 parts of nitrobenzene is added dropwise over one-half hour. The charge is heated at 125°–135° C. for one hour, cooled to room temperature and filtered. The cake, composed of small, reddish-yellow needles, is washed with nitrobenzene, alcohol and water, and then dried. The 1-(2-thenoylamino)anthraquinone obtained has a melting point of 282° C. and an analysis of 4.26% nitrogen and 9.55% sulfur.

The 2-thenoyl chloride may be condensed with other aminoanthraquinones by the same general method. Illustrative aminoanthraquinone compounds which may be employed, and the products obtained therefrom, are given in the following table.

| | Reactant Aminoanthraquinone Derivative | Product | | | |
|---|---|---|---|---|---|
| | | Name | Appearance | Melting Point | Analysis Found |
| | | | | °C. | |
| a | 1-Amino-4-chloroanthraquinone | 1-Chloro-4-(2-thenoylamino) anthraquinone | Yellow needles | 269.5 to 274 | 3.78%—N$_2$ 9.67%—Cl$_1$ |
| b | 1-Amino-5-chloroanthraquinone | 1-Chloro-5-(2-thenoylamino) anthraquinone | do | 250 to 254 | 3.67%—N$_2$ 9.97%—Cl$_1$ |
| c | 1-Amino-6-chloroanthraquinone | 1-(2-thenoylamino)-6-chloroanthraquinone | do | 247 | 3.71%—N$_2$ |
| d | 1-Amino-8-chloroanthraquinone | 1-Chloro-8-(2-thenoylamino) anthraquinone | Greenish-yellow needles | 231.5 | 3.63%—N$_2$ 9.74%—Cl$_1$ |
| e | 1-Amino-2-methyl-4-bromoanthraquinone | 1-(2-thenoylamino)-2-methyl-4-bromoanthraquinone | Yellow needles | 217 to 221 | 3.29%—N$_2$ 18.87%—Br$_1$ |

Example 2

To a mixture of 120 parts of nitrobenzene and 15 parts of leuco 1,4-diaminoanthraquinone under agitation at room temperature, 24 parts of 2-thenoyl chloride are added at once. The charge is heated to 140° C. and held for one hour. It is then cooled to room temperature, filtered and the cake is washed with nitrobenzene and alcohol. The red-orange crystalline product is slurried in 500 parts of 1% sodium carbonate solution at 80° to 90° C. for one-half hour, filtered, washed alkali-free with water and dried. The 1,4-di-(2-thenoylamino)anthraquinone has a melting range of 331.5° to 335° C. and a nitrogen content of 6.03%. It dyes vegetable fibers in red shades from an alkaline hydrosulfite vat.

Example 3

A mixture of 200 parts of nitrobenzene and 25 parts of 1,5-diaminoanthraquinone is heated to 150° C., after which 37 parts of 2-thenoyl chloride are dropped in over one-half hour. The charge is agitated at that temperature for one hour, cooled to room temperature, filtered, and the cake is washed with nitrobenzene and alcohol. The 1,5-di-(2-thenoylamino)anthraquinone, which is a yellow-brown needle-like product, is slurried in water, filtered, washed and dried. It dyes vegetable fibers orange-yellow shades from an alkaline-hydrosulfite vat.

Example 4

A mixture of 50 parts of ortho-dichlorobenzene, 10 parts of 5-chloro-2-thenoic acid and 11.5 parts of thionyl chloride is heated at 70°–80° C. for 2 hours, then aerated at that temperature for one-half hour to remove excess thionyl chloride. To this solution, 40 parts of ortho-dichlorobenzene and 6 parts of 1,5-diaminoanthraquinone are added. The charge is heated at 150° C. for two hours, stirred until cool and filtered. The 1,5-di-(5-chloro-2-thenoylamino)anthraquinone, which is in the form of yellow-brown needles, is washed with ortho-dichlorobenzene, alcohol, slurried in water, filtered, washed with water and dried. It has a melting point of 373° C. and an analysis of 5.49% nitrogen and 12.8% chlorine.

Other 2-thenoic acid derivatives may be reacted with 1,5-diaminoanthraquinone using the same general procedure. Illustrative reactants and the resulting products are given in the following table.

|   | 2-Thenoic Acid Derivative | Product | | | |
|---|---|---|---|---|---|
|   |   | Name | Appearance | Melting point | Analysis |
|   |   |   |   | °C. |   |
| a | 5-Bromo-2-thenoic acid | 1-Chloro-5-(5-bromo-2-thenoylamino)anthraquinone | Red-yellow needles | 240 | 17.22%—Br; |
| b | 5-Methyl-2-thenoic acid | 1-Chloro-5-(5-methyl-2-thenoylamino)anthraquinone | Yellow-green needles | 248.5 | 8.6%—S; 10.1%—Cl; |
| c | 5-Nitro-2-thenoic acid | 1-Chloro-5-(5-nitro-2-thenoylamino)anthraquinone | Orange-yellow needles | 269 to 270 | 6.66%—N; 8.7%—Cl; |

These products dye vegetable fibers in orange-yellow to very red-yellow shades from bluish-colored alkaline hydrosulfite vats.

Example 5

A mixture of 25 parts of 2,6-diaminoanthraquinone and 200 parts of nitrobenzene is heated to 150° C. A solution of 37 parts of 2-thenoyl chloride in 25 parts of nitrobenzene is added dropwise over one-half hour, and the mixture is stirred one hour at 150° C. The temperature is then raised to 175° C. and maintained for one and one-half hours. The charge is cooled and filtered. The 2,6-di-(2-thenoylamino)anthraquinone, which is a yellow-brown crystalline product, is washed with nitrobenzene, alcohol, water and dried. It has a melting point of 375° C. and a nitrogen content of 6.04%.

When treated in a similar manner 1,5-dichloro-2,6-diaminoanthraquinone with 2-thenoyl chloride yields 1,5-dichloro-2,6-di(2-thenoylamino)-anthraquinone, which forms greenish-yellow crystals.

With 5-chloro-2-thenoic acid, 1,5-dichloro-2,6-diaminoanthraquinone yields 1,5-dichloro-2,6-di(5-chloro-2-thenoylamino)anthraquinone which likewise forms greenish-yellow crystals.

Example 6

A mixture of 75 parts of ortho-dichlorobenzene, 19 parts of 5-chloro-2-thenoic acid and 20.8 parts of thionyl chloride is refluxed one and one-half to two hours, and the solution is aerated one-half hour at 90° C. to remove excess thionyl chloride. This solution is cooled to room temperature and 24.5 parts of 1-amino-5-chloroanthraquinone are added. The charge is heated at 125° to 135° C. for one hour, cooled, filtered, and the 1-chloro-5-(5-chloro-2-thenoylamino)-anthraquinone, which is composed of small greenish-yellow needles, is washed with ortho-dichlorobenzene, alcohol, water and dried. It has a melting point of 245° C., a nitrogen content of 3.47% and a chlorine content of 17.5%.

Other 2-thenoic acid derivatives may be condensed with 1-amino-5-chloroanthraquinone by the same general method. Illustrative reactants and the products resulting therefrom are shown in the following table.

|   | 2-Thenoic Acid Derivative | Product | | | |
|---|---|---|---|---|---|
|   |   | Name | Appearance | Melting Point | Analysis |
|   |   |   |   | °C. |   |
| a | 5-Bromo-2-thenoic acid | 1,5-di-(5-bromo-2-thenoylamino)anthraquinone | Yellow-brown | 357 | 4.45%—N; |
| b | 5-Methyl-2-thenoic acid | 1,5-di-(5-methyl-2-thenoylamino)anthraquinone | Red-brown needles | 399 | 5.82%—N; 12.28%—S |

Example 7

A mixture of 225 parts of nitrobenzene, 25 parts of leuco-1,4-diaminoanthraquinone and 1 part of piperidine is heated to 140°–145° C. and maintained for four hours. To this mixture is added 16 parts of dry soda ash and, after the temperature is adjusted at 155° C., a solution of 17 parts of 2-thenoyl chloride in 25 parts of nitrobenzene is added dropwise over two hours. The charge is held on temperature one hour longer, cooled, and filtered. The cake is washed with 120 parts of nitrobenzene, then with alcohol, and then slurried in 500 parts of water at 60° C. for 20 minutes and filtered. The 1-amino-4-(2-thenoylamino)anthraquinone, which is composed of violet-colored needles, is washed alkali-free and dried. It has a melting point of 255°–256° C. and a nitrogen content of 8.01%.

*Example 8*

A mixture of 150 parts of nitrobenzene, 12 parts of soda ash and 1.2 parts of cuprous chloride is heated to 170° C. until all water is expelled, after which 17.7 parts of paratoluene sulfonamide is added and the mixture stirred until smooth. The temperature is raised to 180° C. and 30 parts of 1-chloro-5-(2-thenoylamino)anthraquinone are added over two hours. The temperature is maintained at 200°–205° C. for 6 hours and then lowered to from 90° to 100° C. After the addition of 50 parts of alcohol to thin out the mixture, it is cooled and filtered at from 20° to 30° C. The cake is washed with small quantities of nitrobenzene and alcohol and finally freed from solvent by steam distillation. The yellow-brown crystalline product is filtered, washed alkali-free and dried. To 350 parts of 96% sulfuric acid at 10°–12° C., 35 parts of the dried 1-(2-thenoylamino)-5-paratoluene sulfaminoanthraquinone are added slowly and the mixture is agitated at 10°–12° C. for two hours. The temperature is allowed to rise gradually to 18°–20° C. and maintained overnight. The solution is drowned in 1750 parts of ice and water at 5° C. The precipitate is filtered, washed acid-free, slurried in 900 parts of 0.5% soda ash for two hours and then refiltered. The 1-amino-5-(2-thenoylamino)anthraquinone, which is a red-orange crystalline product, is washed alkali-free and dried. It has a melting point of 282° C. and a nitrogen content of 7.91%.

*Example 9*

A mixture of 200 parts of nitrobenzene and 25 parts of 1-amino-4-hydroxyanthraquinone is heated to 150°–155° C. and held one-half hour. At that temperature 23 parts of 2-thenoyl chloride was added over one hour. The charge is held one hour longer at 150°–155° C., cooled to 70° C. and filtered. The product is washed with 120 parts of warm nitrobenzene and with alcohol. It is slurried in 100 parts of hot alcohol, filtered, washed with hot water and dried. The resulting 1-hydroxy-4-(2-thenoylamino)anthraquinone has a melting point of 285°–286.5° C. and a nitrogen content of 3.94%.

*Example 10*

A mixture of 25 parts of 4,8-diamino-1,5-dihydroxyanthraquinone and 375 parts of ortho-dichlorobenzene is heated to 90°–100° C. and 29 parts of 2-thenoyl chloride are added dropwise over one-half hour. The mixture is heated to 135°–140° C. and held overnight at that temperature. After cooling the charge to 80° C., 15 parts of soda ash are added gradually and agitation is continued at 80°–90° C. for one hour. The charge is filtered at 80° C. The resulting 1,5-dihydroxy-4,8-di-(2'-thenoylamino)anthraquinone is washed with ortho-dichlorobenzene, slurried in 150 parts of methyl alcohol and filtered. It is washed with methyl alcohol, washed alkali-free with water, and then dried. It dyes vegetable fibers in blue shades from an alkaline hydrosulfite vat.

*Example 11*

A mixture of 15 parts of 1-amino-4-nitroanthraquinone, 120 parts of dry nitrobenzene and 9.8 parts of 2-thenoyl chloride is heated at 135°–145° C. for two hours. It is cooled and filtered, and the yellow-brown crystalline product is washed with nitrobenzene, alcohol, water, and dried. The resulting 1-nitro-4-(2-thenoylamino)anthraquinone has a melting range of 309°–311° C., a nitrogen content of 7.32% and a sulfur content of 8.3%.

*Example 12*

A mixture of 120 parts of ortho-dichlorobenzene and 12 parts of 1-amino-4-hydroxy-5-chloroanthraquinone is heated to 125° C. and a solution of 8.7 parts of 2-thenoyl chloride in 12 parts of ortho-dichlorobenzene is then added over one-half hour. The mixture is heated one hour at 130°–135° C., after which 12 parts of soda ash are added and the temperature raised to 175°–180° C. A total of 21 parts of methyl paratoluene sulfonate are dropped in portionwise over a period of 14 hours at 175°–180° C., at which time the reaction is complete. The charge is cooled to room temperature and filtered. The cake, composed of very long red-orange needles, is washed with ortho-dichlorobenzene and alcohol and dried. The resulting 1-(2-thenoylamino)-4-methoxy-5-chloroanthraquinone has a melting point of 287.5° C., a nitrogen content of 3.50% and a chlorine content of 8.8%.

Other 2-thenoic acid derivatives of 1-amino-4-methoxy-5-chloroanthraquinone that have been prepared are included in the following table:

| 2-Thenoic Acid Derivative | Product | | | |
| --- | --- | --- | --- | --- |
| | Name | Appearance | Melting Point | Analysis—Found:Calculated |
| | | | °C. | |
| 5-Chloro-2-thenoic acid | 1-[5-Chloro-2-thenoylamino]-4-methoxy-5-chloroanthraquinone. | Brownish-orange needles. | 250–252 | Percent $Cl_2$=16.40; 16.45. Percent $N_2$=3.02; 3.24. Percent S=6.98; 7.4. |
| 5-Methyl-2-thenoic acid | 1-[5-Methyl-2-thenoylamino]-4-methoxy-5-chloroanthraquinone. | Reddish-orange needles. | 243–245 | Percent $Cl_2$=8.84; 8.62. Percent $N_2$=3.90; 3.40. Percent S=7.58; 7.77. |

Other compounds of this type which may be prepared by the processes as above illustrated are 1-(2-thenoylamino)-2-methylanthraquinone, 1-(5-chloro-2-thenoylamino)-2-methylanthraquinone, 1-(2-thenoylamino)-2-methyl-5-aminoanthraquinone, 1-(2-thenoylamino)-2-methyl-6-aminoanthraquinone, 1-(2-thenoylamino)-5-nitro-6-methylanthraquinone, and 1-(2-thenoylamino)-2,4-dibromo-5-nitro-6-methylanthraquinone.

Thenoylaminoanthraquinone compounds are preferably prepared by condensation of aminoanthraquinones with reactive compounds of 2-thenoic acid and its derivatives, such as the acid chlorides and the anhydrides. Where reactive groups are present in the molecule, the products can then be further reacted. The reactions may be carried out in inert organic solvents such as nitrobenzene, the chlorinated benzenes and the aromatic hydrocarbons. The reaction conditions may be varied widely with respect to time and temperature, depending on the particular reactants employed. A temperature range of 110° to 175° C. usually gives satisfactory results in the thenoylation of aminoanthraquinones, while a range of 140° to 205° C. is generally suitable for further reactions of the thenoylaminoanthraquinones although conditions outside of these ranges may, of course, be employed where found desirable. The time of reaction depends upon the temperature chosen and the reactants used. For the thenoylation reaction, catalysts may be used, and in the further condensation of otherwise substituted thenoylaminoanthraquinones with other compounds, the usual catalysts such as copper salts, and acid binders such as inorganic or organic basic salts, may be employed.

Thenoylamino derivatives of anthraquinone compounds are valuable intermediates for dyes and for certain fibers they are dyes in themselves. The new compounds of this invention are particularly useful in that they are generally deeper in shade than the benzoylaminoanthraquinones, showing increased molecular color value, and give dyes of desirable shades and properties not previously attainable.

The unusual and unexpected effect of the thenoylamino group on the color properties of even the simplest anthraquinone derivative is well illustrated by a comparison of 1-amino-4-benzoylaminoanthraquinone with 1-amino-4-(2-thenoylamino) anthraquinone. When compared in the General Electric Spectrophotometer, the thenoylamino compound is 38.7% stronger on an equal weight basis and 39.3% stronger on a molecular basis. Furthermore, there is a very pronounced bathochromic effect produced by the thenoyl group present in the new molecule.

We claim:

1. Thenoylaminoanthraquinone compounds of the general formula:

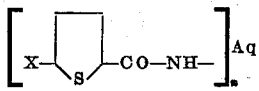

in which $n$ stands for one of the numbers 1 and 2, X stands for a substituent of the class consisting of hydrogen, halogen-, methyl- and nitro-groups, and Aq stands for an anthraquinone nucleus of the group consisting of the otherwise unsubstituted anthraquinone nucleus and the anthraquinone nuclei which carry not more than three substituents of the group consisting of —Cl, —Br, —CH$_3$, —NO$_2$, —NH$_2$, —OH and —OCH$_3$.

2. Thenoylaminoanthraquinone compounds of the general formula:

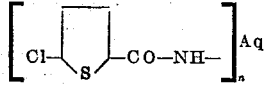

in which $n$ stands for one of the numbers 1 and 2 and Aq stands for an anthraquinone nucleus of the group consisting of the otherwise unsubstituted anthraquinone nucleus and the anthraquinone nuclei which carry not more than three substituents of the group consisting of —Cl, —Br, —CH$_3$, —NO$_2$, —NH$_2$, —OH and —OCH$_3$.

3. 1-(2-thenoylamino)-5-chloroanthraquinone.

4. 1-(5-chloro-2-thenoylamino)-4-methoxy-5-chloroanthraquinone.

5. 1-(5-chloro-2-thenoylamino)-5-chloroantraquinone.

HENRY R. LEE.
CLARENCE F. BELCHER.

REFERENCES CITED

The following references are of record in the file of this patent:

UNITED STATES PATENTS

| Number | Name | Date |
|---|---|---|
| 2,144,220 | Etzelmiller | Jan. 17, 1939 |
| 2,277,409 | Murray | Mar. 24, 1942 |

OTHER REFERENCES

Houben, "Das Anthracen und die Anthrachinone," p. 419, Thieme, Liepzig, 1929.

Richter, "Organic Chemistry," pp. 649–50, John Wiley, N. Y., 1938.